United States Patent
Jain et al.

(10) Patent No.: US 9,066,273 B2
(45) Date of Patent: Jun. 23, 2015

(54) CELL SELECTION BASED ON FAVORABLE ULDL CONFIGURATION IN LTE/TDD NETWORKS

(71) Applicant: QUALCOMM Incorporated, San Diego, CA (US)

(72) Inventors: Sachin Jain, Sunnyvale, CA (US); Debesh Kumar Sahu, Hyderabad (IN); Peter Gaal, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 13/953,502

(22) Filed: Jul. 29, 2013

(65) Prior Publication Data

US 2014/0031037 A1 Jan. 30, 2014

Related U.S. Application Data

(60) Provisional application No. 61/677,343, filed on Jul. 30, 2012.

(51) Int. Cl.
*H04W 36/24* (2009.01)
*H04W 36/00* (2009.01)
(Continued)

(52) U.S. Cl.
CPC .............. *H04W 36/24* (2013.01); *H04W 72/12* (2013.01); *H04W 36/0083* (2013.01); *H04W 36/08* (2013.01); *H04W 48/20* (2013.01)

(58) Field of Classification Search
CPC ................... H04W 72/0446; H04W 72/0406; H04W 72/042; H04W 72/04; H04W 72/0413; H04W 72/02
See application file for complete search history.

(56) References Cited

U.S. PATENT DOCUMENTS 8,396,030 B2   3/2013   Frederiksen et al.
8,462,672 B2   6/2013   Kim et al.
(Continued)

FOREIGN PATENT DOCUMENTS

WO   WO-2008154802 A   12/2008
WO   WO-2009120701 A   10/2009
(Continued)

OTHER PUBLICATIONS

International Search Report and Written Opinion—PCT/US2013/052740—ISA/EPO—Oct. 24, 2013.

*Primary Examiner* — George Eng
*Assistant Examiner* — Nam Huynh
(74) *Attorney, Agent, or Firm* — Norton Rose Fulbright US LLP

(57) ABSTRACT

Cell selection procedures performed in a wireless network are disclosed that include determining a uplink/downlink (ULDL) preference of a User Equipment (UE) in communication with a first evolved Node B (eNB) having a first ULDL configuration and a second eNB having a second ULDL configuration. The UE compares the first and second ULDL configurations to the ULDL preference. The UE selects the first eNB based on the first ULDL configuration matching the ULDL preference. In alternative aspects, a first eNB having a first ULDL configuration and in communication with a UE receives the ULDL preference of the UE. The first eNB compares the first ULDL configuration and a second ULDL configuration of a second eNB in communication with the UE to the ULDL preference. The first eNB selects the second eNB based on the second ULDL configuration matching the ULDL preference.

40 Claims, 8 Drawing Sheets

| Uplink/Downlink Configuration | Downlink-to-Uplink Switch-Point Periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | U |

(51) Int. Cl.
*H04W 72/12* (2009.01)
*H04W 36/08* (2009.01)
*H04W 48/20* (2009.01)

(56) References Cited

U.S. PATENT DOCUMENTS

2003/0193910 A1 10/2003 Shoaib et al.
2011/0105165 A1 5/2011 Sagfors et al.
2011/0211503 A1 9/2011 Che et al.
2012/0113875 A1* 5/2012 Alanara et al. ............... 370/280
2013/0155915 A1 6/2013 Park et al.
2013/0279377 A1* 10/2013 Zhao et al. ................... 370/280

FOREIGN PATENT DOCUMENTS

WO WO-2010086498 A 8/2010
WO WO-2012166029 A 12/2012

* cited by examiner

CELL SELECTION BASED ON FAVORABLE ULDL CONFIGURATION IN LTE/TDD NETWORKS

CROSS-REFERENCE TO RELATED APPLICATIONS

This application claims the benefit of U.S. Provisional Patent Application No. 61/677,343, entitled, "CELL SELECTION BASED ON FAVORABLE ULDL CONFIGURATION IN LTE/TDD NETWORKS", filed on Jul. 30, 2012, which is expressly incorporated by reference herein in its entirety.

BACKGROUND

1. Field

Aspects of the present disclosure relate generally to wireless communication systems, and more particularly, to cell selection in LTE/TDD networks.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNBs that can support communication for a number of user equipments (UEs). A UE may communicate with an eNB via the downlink and uplink. The downlink (or forward link) refers to the communication link from the eNB to the UE, and the uplink (or reverse link) refers to the communication link from the UE to the eNB.

SUMMARY

In one aspect, a method for performing cell selection in a wireless network includes determining, by a User Equipment (UE) in communication with a first evolved Node B (eNB) having a first uplink/downlink (ULDL) configuration and a second eNB having a second ULDL configuration, a ULDL preference of the UE. The method additionally includes comparing, by the UE, the first ULDL configuration and the second ULDL configuration to the ULDL preference of the UE. The method also includes selecting, by the UE, the first eNB based at least in part on the comparing resulting in the first ULDL configuration matching the ULDL preference.

In another aspect, an apparatus for performing cell selection in a wireless network includes means for determining, by a UE in communication with a first eNB having a first ULDL configuration and a second eNB having a second ULDL configuration, a ULDL preference of the UE. The apparatus additionally includes means for comparing, by the UE, the first ULDL configuration and the second ULDL configuration to the ULDL preference of the UE. The apparatus also includes means for selecting, by the UE, the first eNB based at least in part on the means for comparing concluding that the first ULDL configuration matches the ULDL preference.

In an additional aspect, a computer program product includes a non-transitory computer-readable medium having code for determining, by a UE in communication with a first eNB having a first ULDL configuration and a second eNB having a second ULDL configuration, a ULDL preference of the UE. The non-transitory computer-readable medium additionally has code for comparing, by the UE, the first ULDL configuration and the second ULDL configuration to the ULDL preference of the UE. The non-transitory computer-readable medium further has code for selecting, by the UE, the first eNB based at least in part on the code for comparing concluding that the first ULDL configuration matches the ULDL preference.

In a further aspect, a UE is in communication with a first eNB having a first ULDL configuration and a second eNB having a second ULDL configuration. The UE includes one or more processors and a memory coupled to the one or more processors. The one or more processors is configured to determine a ULDL preference of the UE, and compare the first ULDL configuration and the second ULDL configuration to the ULDL preference of the UE. The one or more processors is additionally configured to select the first eNB based at least in part on the at least one processor concluding that the first ULDL configuration matches the ULDL preference.

In an alternative aspect, a method for performing cell selection in a wireless network includes receiving, by a first eNB having a first ULDL configuration and in communication with a UE, a ULDL preference of the UE. The method additionally includes comparing, by the first eNB, the first ULDL configuration and a second ULDL configuration of a second eNB in communication with the UE to the ULDL preference of the UE. The method also includes selecting, by the first eNB, the second eNB based at least in part on the second ULDL configuration matching the ULDL preference.

In another alternative aspect, an apparatus for performing cell selection in a wireless network includes means for receiving, by a first eNB having a first ULDL configuration and in communication with a UE, a ULDL preference of the UE. The apparatus additionally includes means for comparing, by the first eNB, the first ULDL configuration and a second ULDL configuration of a second eNB in communication with the UE to the ULDL preference of the UE. The apparatus also includes means for selecting, by the first eNB, the second eNB based at least in part on the second ULDL configuration matching the ULDL preference.

In an additional alternative aspect, a computer program product includes a non-transitory computer-readable medium having code for receiving, by a first eNB having a first ULDL configuration and in communication with a UE, a ULDL preference of the UE. The non-transitory computer-readable medium additionally has code for comparing, by the first eNB, the first ULDL configuration and a second ULDL configuration of a second eNB in communication with the UE to the ULDL preference of the UE. The non-transitory computer-readable medium further has code for selecting, by the first eNB, the second eNB based at least in part on the second ULDL configuration matching the ULDL preference.

In a further alternative aspect, an eNB having a first ULDL configuration and in communication with a UE, the eNB includes one or more processors and a memory coupled to the one or more processors. The one or more processors is configured to receive a ULDL preference of the UE and compare the first ULDL configuration and a second ULDL configuration of a second eNB in communication with the UE to the ULDL preference of the UE. The one or more processors is additionally configured to select the other eNB based at least in part on the second ULDL configuration matching the ULDL preference.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA TDS-CDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
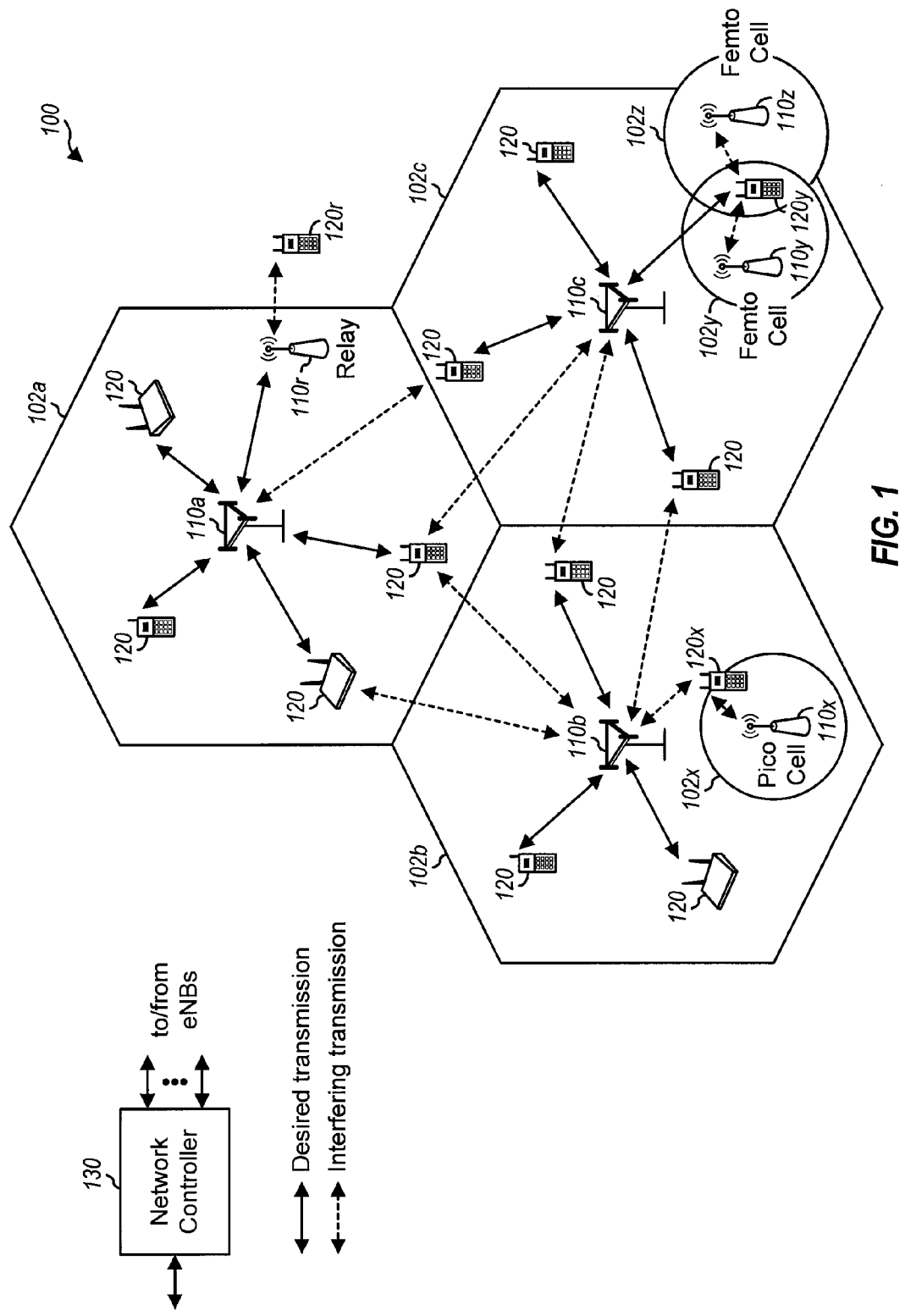
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.4, 3, 5, 10 or 20 MHz, respectively.

Figure 2:
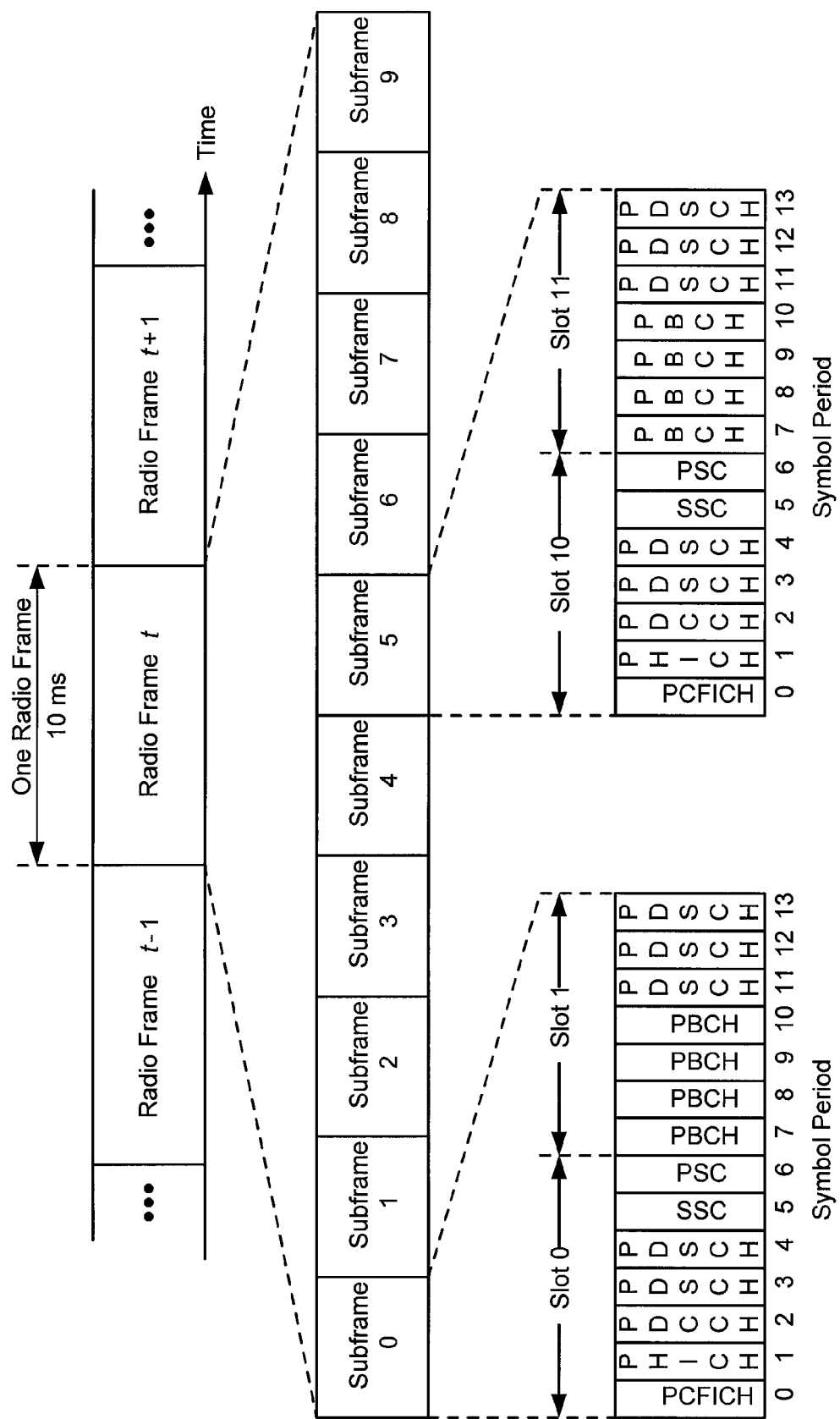
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
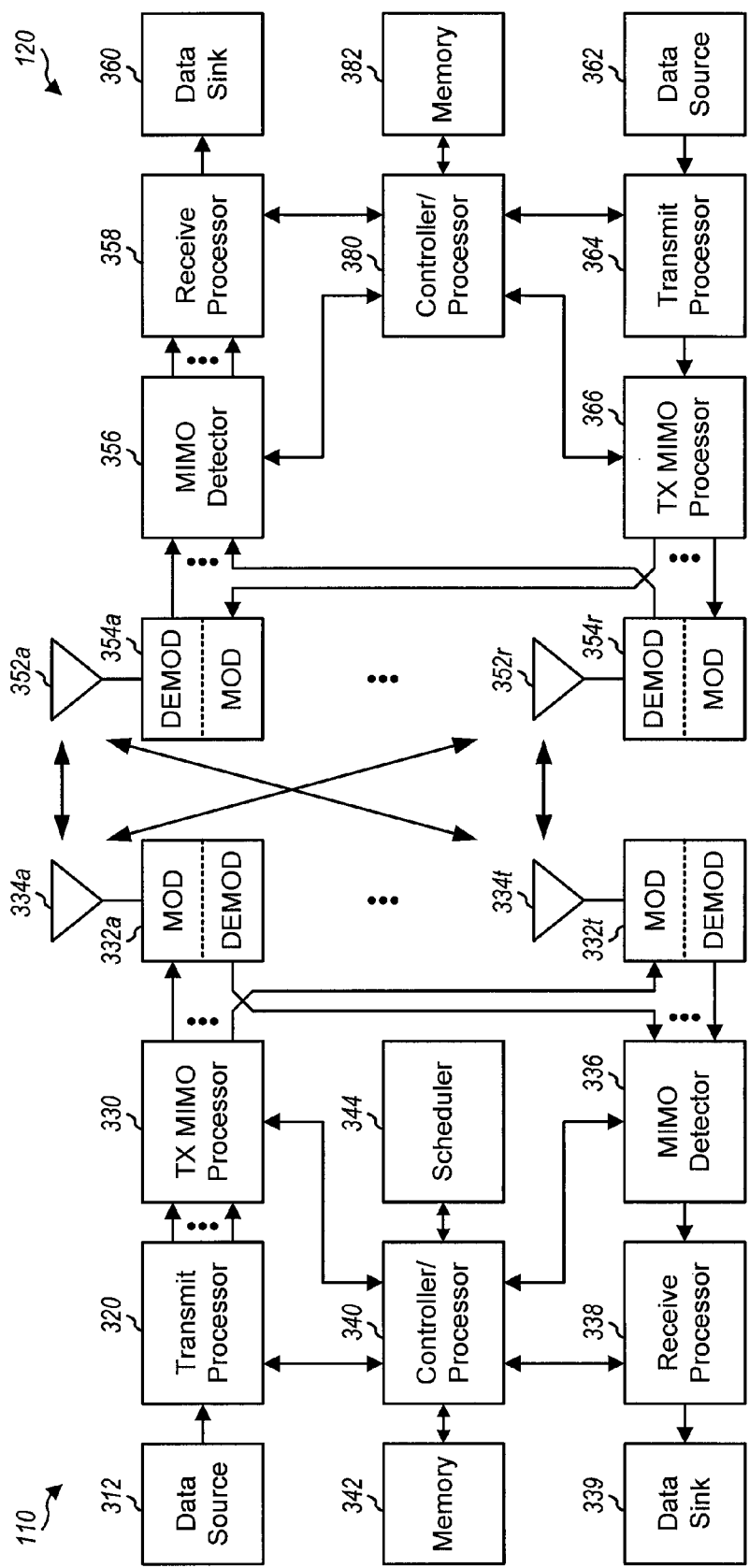
FIG. 3 is a block diagram conceptually illustrating a design of an eNB and a UE configured according to one aspect of the present disclosure.

FIG. 3 shows a block diagram of a design of an eNB 110 and a UE 120, which may be one of the eNBs and one of the UEs in FIG. 1. For a restricted association scenario, the eNB 110 may be the macro eNB 110c in FIG. 1, and the UE 120 may be the UE 120y. The eNB 110 may be equipped with antennas 334a through 334t, and the UE 120 may be equipped with antennas 352a through 352r.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNB 110. At the eNB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The processor 340 and/or other processors and modules at the eNB 110 may perform or direct the execution of various processes for the techniques described herein. The processor 380 and/or other processors and modules at the UE 120 may also perform or direct the execution of the functional blocks illustrated in FIGS. 6-7, and/or other processes for the techniques described herein. The memories 342 and 382 may store data and program codes for the eNB 110 and the UE 120, respectively. A scheduler 344 may schedule UEs for data transmission on the downlink and/or uplink.

In one configuration, the UE 120 for wireless communication includes means for detecting interference from an interfering eNB during a connection mode of the UE, means for selecting a yielded resource of the interfering eNB, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figures 4, 5:
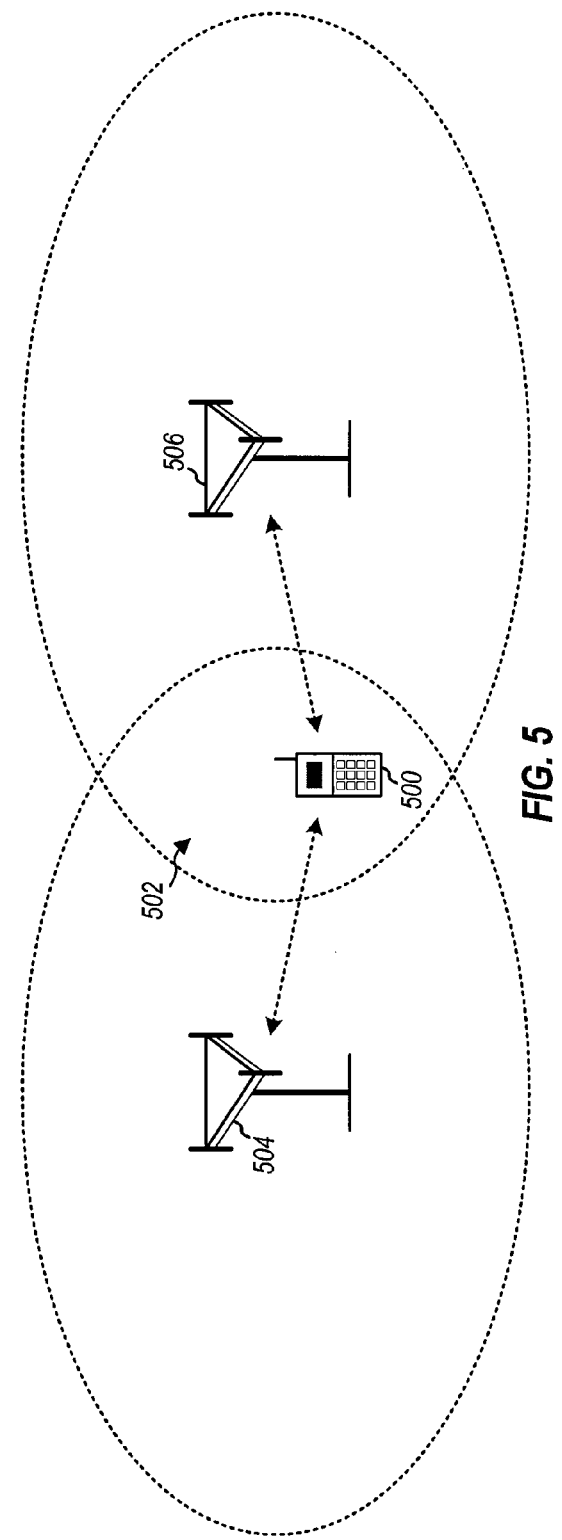
FIG. 4 is a graphical illustration of various ULDL configurations in an LTE/TDD network according to one aspect of the present disclosure.
FIG. 5 is a block diagram conceptually illustrating overlapping cell coverage areas in an LTE/TDD network according to one aspect of the present disclosure.

FIG. 4 illustrates available ULDL configurations in LTE TDD. LTE TDD uses the same frequency bands for the uplink (UL) and the downlink (DL). Therefore, the transmission directions are separated by carrying UL and DL data in different subframes. The allocation of subframes between UL and DL transmissions may be adapted to data traffic and may be performed either symmetrically, (i.e., equal number of UL and DL subframes) or asymmetrically. This flexibility in UL and DL subframe allocation enables more efficient utilization of radio bandwidth.

The UL and DL subframe allocation is generally periodic and usually defined by the periodicity of the Uplink-to-Downlink switch point. This switch point is the Guard Period (GP) between the special slots DwPTS and UpPTS. The periodicity can be 10 ms or 5 ms. Accordingly, ULDL configurations may be categorized as uplink heavy, downlink heavy, or symmetric, depending on the proportion of downlink slots D to uplink slots U. In FIG. 4, for example, configuration 1 is symmetric, while configurations 3, 2, 4, and 5 are downlink heavy, and configurations 0 and 6 are uplink heavy. Moreover, it should be understood that two configurations in the same category may be more or less UL or DL heavy than the other. For example, configuration 2 is 3:1 DL heavy, while configuration 5 is 8:1 DL heavy.

FIG. 5 shows a UE 500 in an overlapping cell coverage area 502 provided by eNBs 504 and 506 having different Uplink/Downlink (ULDL). The UE 500 may have a ULDL preference related to its present or predicted future ULDL operations. For example, the UE may be initiating or engaged in a DL heavy process (e.g., downloading audio or video files to the UE), a UL heavy process (e.g., sending video files or transmitting data from the UE), or a symmetric process. In some aspects, the UE 500 may be responsive to a user selection as to which ULDL configuration it prefers. In others of these aspects, the UE 500 may determine its ULDL preference based on past ULDL behavior of the UE, and/or future predictions thereof. For example, if a user has selected to start an application, the UE may access a log of ULDL behavior recorded during previous instances of usage of the application. It should be understood that a ULDL preference of UE may be for a category, such as UL heavy, DL heavy, or symmetric. Alternatively or additionally, the ULDL preference of the UE may correspond to a particular UL:DL or DL:UL proportion.

In some aspects, UE 500 may be configured to select between the two eNBs 504 and 506 based on their respective ULDL configurations, and which configuration is a better match, categorically or proportionately, to the ULDL preference of the UE. In the event that one ULDL configuration is not presently a better match to the UE's ULDL preference, then one of the eNBs may be selected on the basis that it has a dynamic configuration, whereas the other eNB does not. In other aspects, UE 500 may communicate its ULDL preference to one or more of the eNBs 504 and 506, and one of the two eNBs 504 and 506 may select one of the two eNBs 504 and 506 for the UE. If one of the two eNBs 504 and 506 finds, from the UE's ULDL preference, that the current cell is no longer the preferred cell, then that eNB can trigger handover to move the UE 500 to the preferred eNB, if available.

Figure 6:
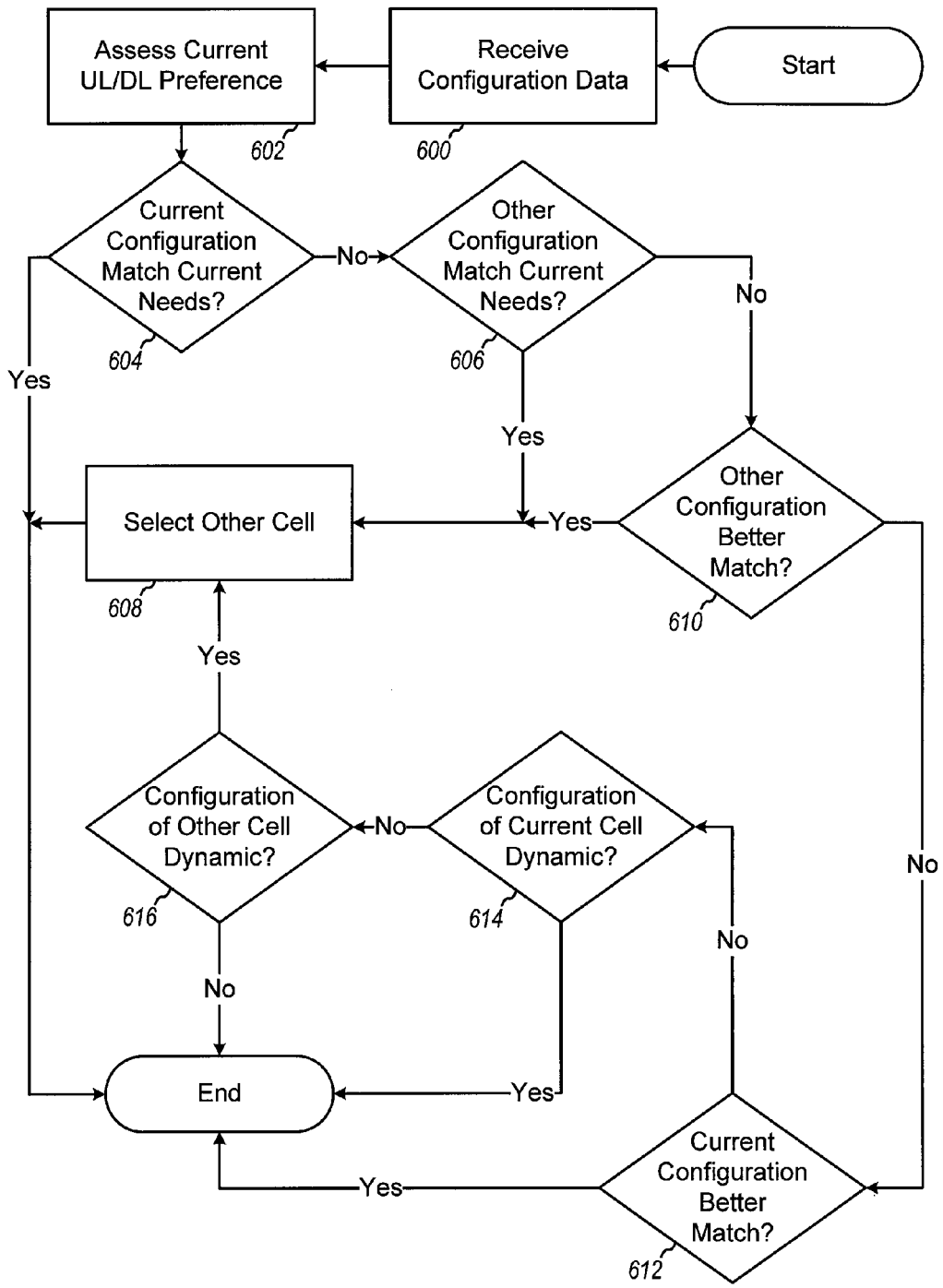
FIG. 6 is a functional block diagram conceptually illustrating example blocks executed by a UE according to one aspect of the present disclosure.

FIG. 6 illustrates example blocks performed by a UE. In some aspects, the UE may receive configuration data from eNBs at block 600. Receipt of the configuration data by the UE, at block 600, may include receiving dynamic configuration capability information in System Information Blocks (SIBs) or though other messages. At block 602, the UE may assess its ULDL preference based on past behavior, for example, and/or future predictions, and/or user preference/selection settings. For example, if a user has selected to start an application, the UE may access a log of ULDL behavior recorded during previous instances of usage of the application. At block 604, as part of a cell selection or Idle mode procedure, a determination is made whether the current ULDL configuration of the current cell matches the ULDL preference. If there is a match, then processing ends. However, if there is no match, then another determination is made at block 606 whether another ULDL configuration of another cell is a match to the ULDL preference. If the other ULDL configuration is a match, then the other cell may be selected, at block 608. However, if the other configuration is not a match either, then a determination is made, at block 610, whether the ULDL configuration of the other cell is a better match to the ULDL preference than the ULDL configuration of the current cell. In Idle mode, the UE may perform a neighbor cell search and discover whether a more preferred cell is available. If the UE discovers a more preferred cell, then the UE may reselect to the preferred cell.

The UE may operate, at block 610, by comparing UL:DL proportions and/or DL:UL proportions of the ULDL configurations to a preferred UL:DL proportion of the ULDL preference, and by determining if one comparison result is smaller than the other. If a determination is made that the ULDL configuration is a better match, then the other cell may be selected at block 608, resulting in triggering of a reselection procedure to transfer the UE to the newly selected cell. However, if it is determined that the other ULDL configuration is not a better match, then a further determination is made, at block 612, whether the ULDL configuration is a better match to the ULDL preference than the ULDL preference of the other cell. If it is determined that the ULDL configuration of the current cell is a better match, then processing ends. However, if it is determined that the ULDL configuration of the current cell is not a better match, then a determination is made, at block 614, whether the ULDL configuration of the current cell is dynamic. If it is determined that the ULDL configuration of the current cell is dynamic, then processing ends. However, if it is determined that the ULDL configuration of the current cell is not dynamic, then another determination is made, at block 616, whether the ULDL configuration of the other cell is dynamic. If it is determined that the ULDL configuration of the other cell is not dynamic either, then processing ends. Otherwise, if it is determined that the ULDL configuration is dynamic, then the other cell may be selected at block 608, resulting in triggering of a reselection procedure to transfer the UE to the newly selected cell. These example blocks may also be performed for an initial Cell selection procedure.

Figure 7:
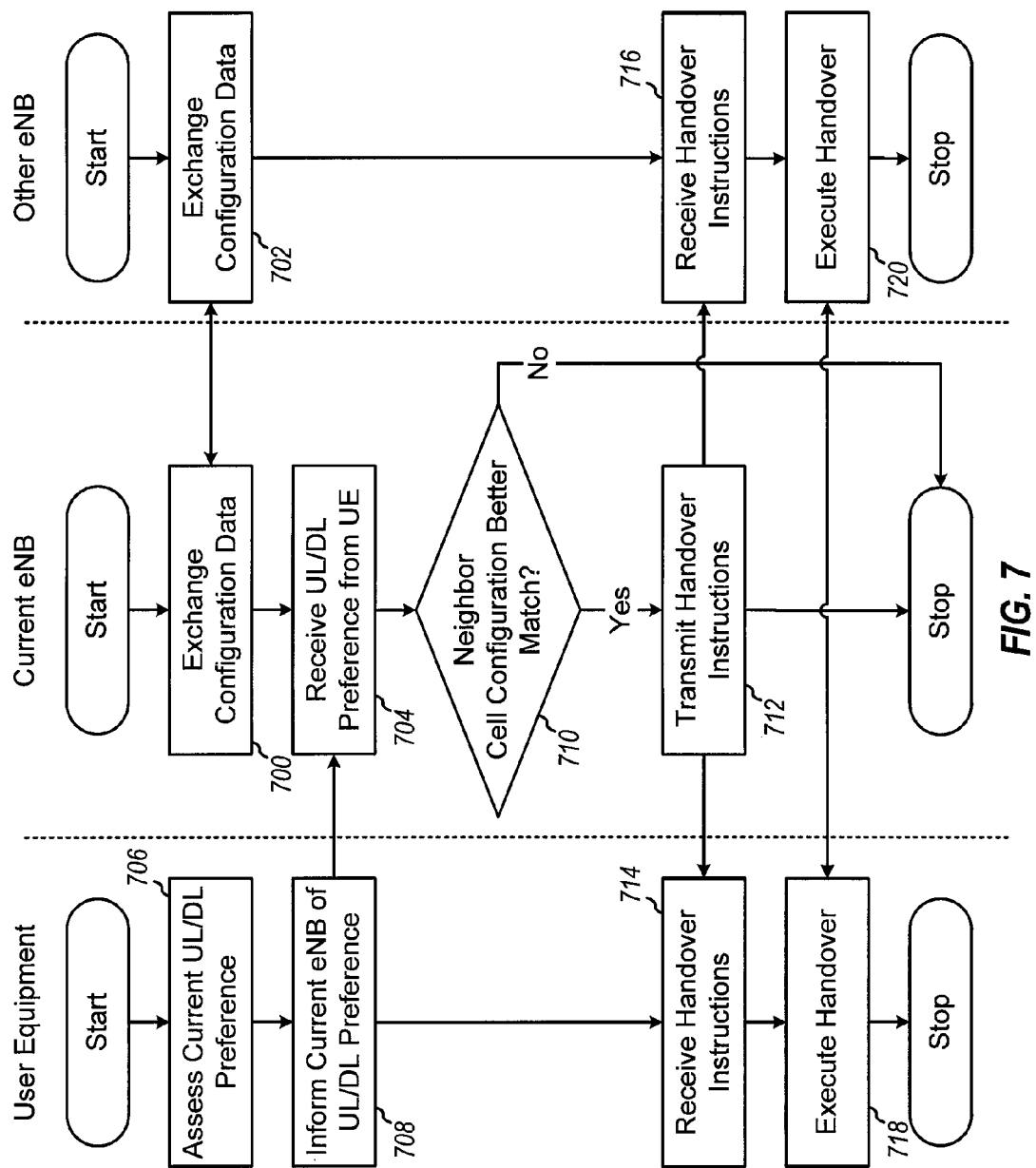
FIG. 7 is a functional block diagram conceptually illustrating example blocks executed by an eNB according to one aspect of the present disclosure.

FIG. 7 illustrates example blocks of a cell selection procedure performed by an eNB. The eNB may exchange configuration data with another eNB at block 700 by using backhaul, X2, or any other suitable technique. The other eNB may also be configured to exchange ULDL configuration data at block 702. The configuration data may also include information regarding whether the ULDL configuration is dynamic. At block 704, the eNB receives ULDL preference information from a UE. The UE may be configured to have assessed the current ULDL preference at block 706 as discussed above, and to transmit the ULDL preference information to its current eNB at block 708. In some aspects, the ULDL preference information may also include the configuration data of other cells with which the UE is able to communicate. Then, at block 710, the eNB may determine whether a neighbor cell's ULDL configuration is a better match using the process described above. Thus, the eNB may take into account the ULDL configuration category, UL:DL or DL:UL proportion, and/or dynamic configuration capability previously described. If it is determined that no other ULDL configuration is a better match, then processing ends. Otherwise, if it is determined that the other eNB has a ULDL configuration that is a better match to the ULDL preference of the UE, then the eNB may trigger handover of the UE to the other eNB, at block 712, by, for example, transmitting handover instructions to the other eNB and/or the UE. Upon receiving the handover instructions, at blocks 714 and 716, the UE and the other eNB may execute the handover procedure at blocks 718 and 720.

Figure 8:
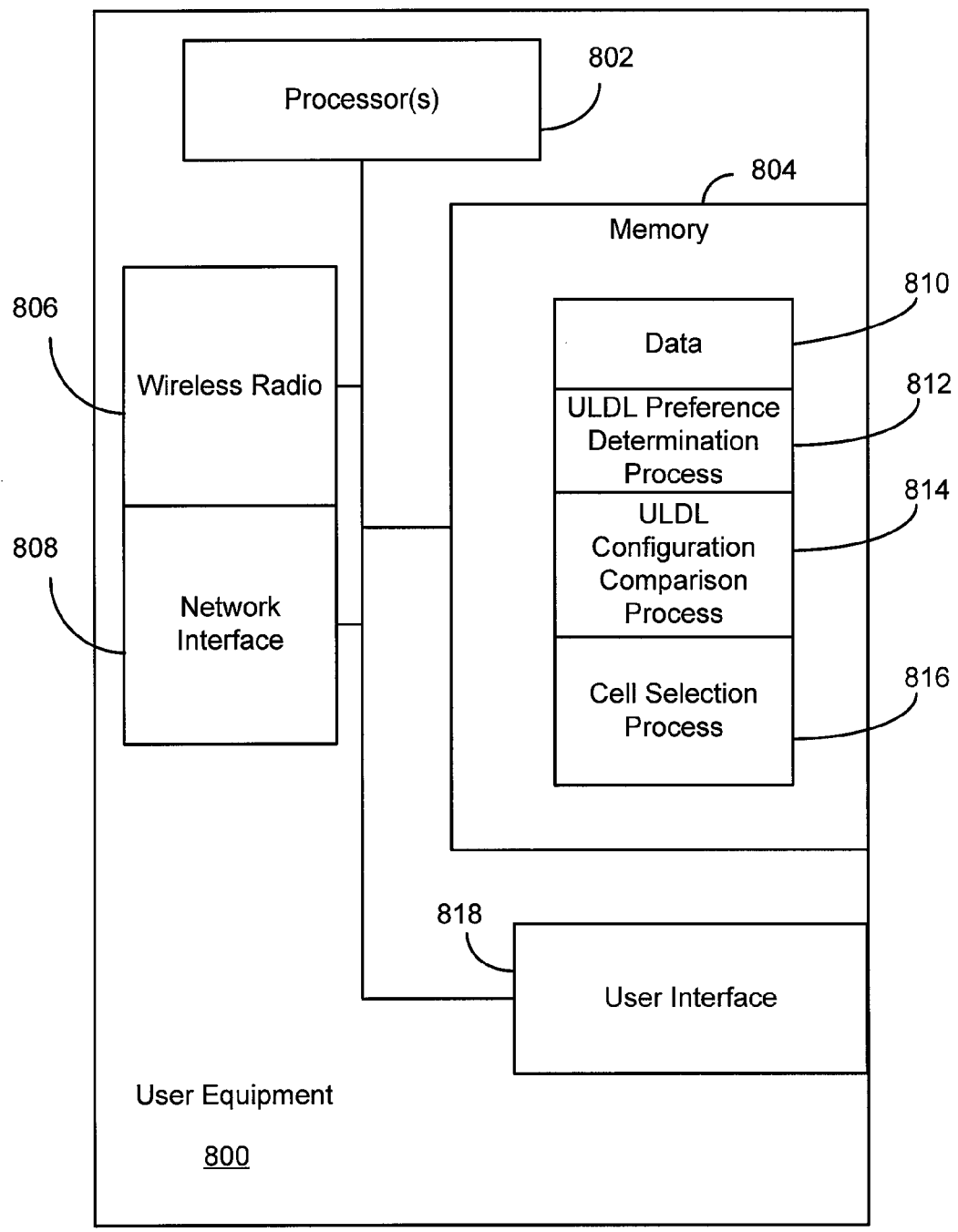
FIG. 8 is a block diagram illustrating a UE configured according to one aspect of the present disclosure.

FIG. 8 illustrates a UE 800 having one or more processors 802, memory 804, a wireless radio 806, a network interface 808, and a user interface 818. Memory 804 has stored therein data 810, and various code, instructions, applications, algorithms, and/or processes executable by processors 802 to carry out the example blocks of FIG. 6. For example, a ULDL preference determination process 812, when executed by processors 802, may carry out the ULDL preference determination process previously described. Process 812 may record logs of ULDL activity in memory 804 during operation of UE 800, and access these logs to predict the ULDL preference. Additionally or alternatively, process 812 may receive a user selection over user interface 818 that specifies the ULDL preference of the UE. Together, processors 802, memory 804, user interface 818, and process 812 may provide the means for determining, by a UE 800 in communication with a first eNB having a first ULDL configuration and a second eNB having a second ULDL configuration, a ULDL preference of the UE 800, wherein the means for determining the ULDL preference of the UE 800 includes means for receiving a user selection indicating the ULDL preference, and/or means for predicting future ULDL behavior of the UE 800 based at least in part on past ULDL behavior of the UE 800.

ULDL configuration comparison process 814, when executed by processors 802, may carry out the ULDL configuration comparison process previously described. For example, process 814 may receive ULDL configuration information from neighboring eNBs over wireless radio 806 and network interface 808. Also, process 814 may determine which of the ULDL configurations best matches the ULDL preference of the UE 800. Together, processors 802, memory 804, wireless radio 806, network interface 808, and process 814 provide the means for comparing, by the UE 800, the first ULDL configuration and the second ULDL configuration to the ULDL preference of the UE 800, wherein the means for comparing includes means for comparing uplink heavy configurations, downlink heavy configurations, and symmetric configurations.

Cell selection process 816, when executed by processors 802, may carry out the cell selection process previously described. For example, process 816 may select an eNB having a ULDL configuration that best matches the ULDL preference of the UE 800. Additionally, process 816 may detect whether one, but not both, of the ULDL configurations are dynamic configurations, and select an eNB having a dynamic configuration. Together, processors 802, memory 804, and process 816 provide the means for selecting, by the UE 800, the first eNB based at least in part on the means for comparing concluding that the first ULDL configuration matches the ULDL preference. Together, processors 802, memory 804, and process 816 also provide the means for detecting whether one of the first ULDL configuration or the second ULDL configuration, but not both, is a dynamic configuration. The means for detecting is responsive to neither the first ULDL configuration nor the second ULDL configuration matching the ULDL preference of the UE, and the means for selecting selects one of: the first ULDL configuration or the second ULDL configuration being the dynamic configuration.

Figure 9:
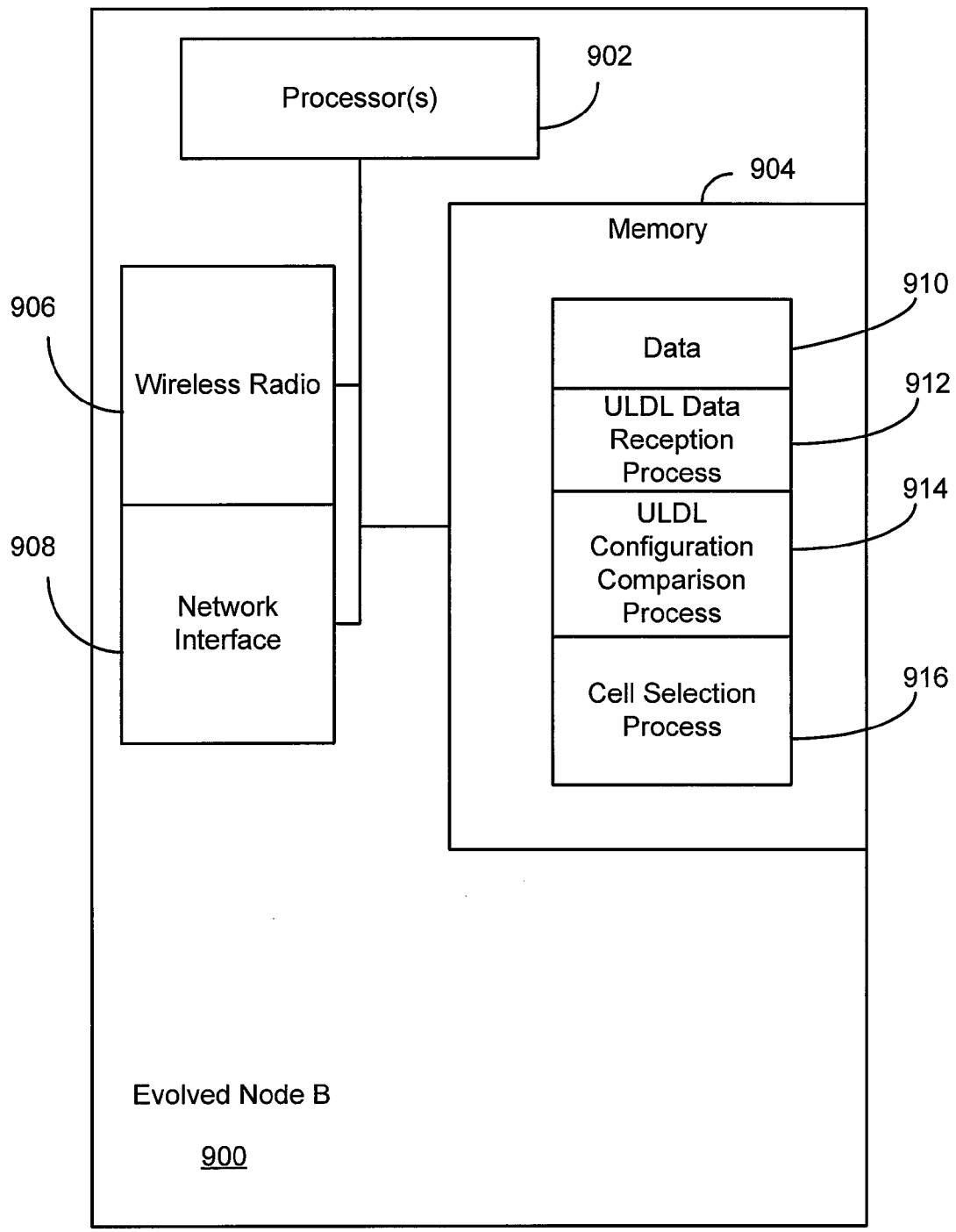
FIG. 9 is a block diagram illustrating an eNB configured according to one aspect of the present disclosure.

FIG. 9 illustrates an eNB 900 having one or more processors 902, memory 904, a wireless radio 906, and a network interface 908. Memory 904 has stored therein data 910, and various code, instructions, applications, algorithms, and/or processes executable by processors 902 to carry out the example blocks of FIG. 7. For example, a ULDL data reception process 912, when executed by processors 902, may carry out the ULDL data reception process previously described. Process 912 may receive a ULDL preference from a UE over wireless radio 906 and network interface 908. Process 912 may also receive ULDL configuration information of neighboring eNBs, from the eNBs or from the UE, over network interface 908, and/or over wireless radio 906. Together, processors 902, memory 904, wireless radio 906, network interface 908, and process 912 may provide the means for receiving, by a first evolved Node B (eNB) having a first uplink/downlink (ULDL) configuration and in communication with a User Equipment (UE), a ULDL preference of the UE, and means for exchanging ULDL data with another eNB.

ULDL configuration comparison process 914, when executed by processors 902, may carry out the ULDL configuration comparison process previously described. For example, process 914 may determine which of the ULDL configurations best matches the ULDL preference of the UE. Together, processors 902, memory 904, and process 914 provide the means for comparing, by the eNB 900, a first ULDL configuration of the eNB 900 and a second ULDL configuration of another eNB in communication with the UE to the ULDL preference of the UE, including means for comparing uplink heavy configurations, downlink heavy configurations, and symmetric configurations.

Cell selection process 916, when executed by processors 902, may carry out the cell selection process previously described. For example, process 916 may select an eNB having a ULDL configuration that best matches the ULDL preference of the UE. Additionally, process 916 may detect whether one, but not both, of the ULDL configurations are dynamic configurations, and select an eNB having a dynamic configuration. Also, process 916 may trigger processors 902 to operate wireless radio 906 and/or network interface 908 to trigger handover of the UE to the other eNB. Together, processors 902, memory 904, and process 916 provide the means for selecting, by the first eNB, the second eNB based at least in part on the second ULDL configuration matching the ULDL preference. Together, processors 902, memory 904, and process 916 also provide the means for detecting whether one of the first ULDL configuration or the second ULDL configuration, but not both, is a dynamic configuration. The means for detecting performs the detecting in response to neither the first configuration nor the second configuration matching the ULDL preference of the UE, and the means for selecting includes means for selecting one of: the first eNB or the second eNB having the dynamic configuration. Together, processors 902, memory 904, wireless radio 906, network interface 908, and process 916 further provide the means for triggering handover of the UE to the second eNB in response to selection of the second eNB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing cell selection in a wireless network, the method comprising:
    determining, by a User Equipment (UE) in communication with a first evolved Node B (eNB) having a first uplink/downlink (ULDL) configuration and a second eNB having a second ULDL configuration, a ULDL preference of the UE;
    comparing, by the UE, the first ULDL configuration and the second ULDL configuration to the ULDL preference of the UE; and
    selecting, by the UE, the first eNB based at least in part on the comparing resulting in the first ULDL configuration matching the ULDL preference.

2. The method of claim 1, wherein determining the ULDL preference of the UE includes receiving a user selection indicating the ULDL preference.

3. The method of claim 1, wherein determining the ULDL preference of the UE includes predicting future ULDL behavior of the UE based at least in part on past ULDL behavior of the UE.

4. The method of claim 1, wherein the comparing includes comparing uplink heavy configurations, downlink heavy configurations, and symmetric configurations.

5. The method of claim 1, further including:
    detecting whether one of the first ULDL configuration or the second ULDL configuration, but not both, is a dynamic configuration, wherein the detecting is performed in response to the comparing resulting in neither the first ULDL configuration nor the second ULDL configuration matching the ULDL preference of the UE,
    wherein the selecting selects one of: the first ULDL configuration or the second ULDL configuration being the dynamic configuration.

6. An apparatus for performing cell selection in a wireless network, said apparatus comprising:
    means for determining, by a User Equipment (UE) in communication with a first evolved Node B (eNB) having a first uplink/downlink (ULDL) configuration and a second eNB having a second ULDL configuration, a ULDL preference of the UE;
    means for comparing, by the UE, the first ULDL configuration and the second ULDL configuration to the ULDL preference of the UE; and
    means for selecting, by the UE, the first eNB based at least in part on the means for comparing concluding that the first ULDL configuration matches the ULDL preference.

7. The apparatus of claim 6, wherein the means for determining the ULDL preference of the UE includes means for receiving a user selection indicating the ULDL preference.

8. The apparatus of claim 6, wherein the means for determining the ULDL preference of the UE includes means for predicting future ULDL behavior of the UE based at least in part on past ULDL behavior of the UE.

9. The apparatus of claim 6, wherein the means for comparing includes means for comparing uplink heavy configurations, downlink heavy configurations, and symmetric configurations.

10. The apparatus of claim 6, wherein the apparatus further includes:
    means for detecting whether one of the first ULDL configuration or the second ULDL configuration, but not both, is a dynamic configuration, wherein the means for detecting is responsive to neither the first ULDL configuration nor the second ULDL configuration matching the ULDL preference of the UE,
    wherein the means for selecting selects one of: the first ULDL configuration or the second ULDL configuration being the dynamic configuration.

11. A computer program product comprising:
    a non-transitory computer-readable medium including:
        code for determining, by a User Equipment (UE) in communication with a first evolved Node B (eNB) having a first uplink/downlink (ULDL) configuration and a second eNB having a second ULDL configuration, a ULDL preference of the UE;
        code for comparing, by the UE, the first ULDL configuration and the second ULDL configuration to the ULDL preference of the UE; and
        code for selecting, by the UE, the first eNB based at least in part on the code for comparing concluding that the first ULDL configuration matches the ULDL preference.

12. The computer program product of claim 11, wherein the code for determining the ULDL preference of the UE includes code for receiving a user selection indicating the ULDL preference.

13. The computer program product of claim 11, wherein the code for determining the ULDL preference of the UE includes code for predicting future ULDL behavior of the UE based at least in part on past ULDL behavior of the UE.

14. The computer program product of claim 11, wherein the code for comparing includes code for comparing uplink heavy configurations, downlink heavy configurations, and symmetric configurations.

15. The computer program product of claim of claim 11, wherein the computer-readable medium further includes:
- code for detecting whether one of the first ULDL configuration or the second ULDL configuration, but not both, is a dynamic configuration, wherein the code for detecting is responsive to the code for comparing concluding that neither the first ULDL configuration nor the second ULDL configuration matches the ULDL preference of the UE,
- wherein the code for selecting selects one of: the first ULDL configuration or the second ULDL configuration being the dynamic configuration.

16. A user equipment (UE) in communication with a first evolved Node B (eNB) having a first uplink/downlink (ULDL) configuration and a second eNB having a second ULDL configuration, the UE comprising:
- at least one processor; and
- a memory coupled to said at least one processor,
- wherein said at least one processor is configured to:
  - determine a ULDL preference of the UE;
  - compare the first ULDL configuration and the second ULDL configuration to the ULDL preference of the UE; and
  - select the first eNB based at least in part on the at least one processor concluding that the first ULDL configuration matches the ULDL preference.

17. The UE of claim 16, wherein the at least one processor is configured to determine the ULDL preference of the UE by receiving a user selection indicating the ULDL preference.

18. The UE of claim 16, wherein the at least one processor is configured to determine the ULDL preference of the UE by predicting future ULDL behavior of the UE based at least in part on past ULDL behavior of the UE.

19. The UE of claim 16, wherein the at least one processor is configured to compare uplink heavy configurations, downlink heavy configurations, and symmetric configurations.

20. The UE of claim 16, wherein the at least one processor is further configured to:
- detect whether one of the first ULDL configuration or the second ULDL configuration, but not both, is a dynamic configuration, wherein the at least one processor is configured to detect in response to the compare concluding that neither the first ULDL configuration nor the second ULDL configuration matches the ULDL preference of the UE,
- wherein the at least one processor is configured to select one of: the first ULDL configuration or the second ULDL configuration being the dynamic configuration.

21. A method for performing cell selection in a wireless network, the method comprising:
- receiving, by a first evolved Node B (eNB) having a first uplink/downlink (ULDL) configuration and in communication with a User Equipment (UE), a ULDL preference of the UE;
- comparing, by the first eNB, the first ULDL configuration and a second ULDL configuration of a second eNB in communication with the UE to the ULDL preference of the UE; and
- selecting, by the first eNB, the second eNB based at least in part on the second ULDL configuration matching the ULDL preference.

22. The method of claim 21, wherein the making the comparing includes comparing uplink heavy configurations, downlink heavy configurations, and symmetric configurations.

23. The method of claim 21, wherein the method further includes:
- detecting whether one of the first ULDL configuration or the second ULDL configuration, but not both, is a dynamic configuration, wherein the detecting is performed in response to neither the first configuration nor the second configuration matching the ULDL preference of the UE,
- wherein the selecting includes selecting one of: the first eNB or the second eNB having the dynamic configuration.

24. The method of claim 21, wherein the method further includes:
- exchanging ULDL configuration data with the second eNB.

25. The method of claim 21, wherein the method further includes:
- triggering handover of the UE to the second eNB in response to selection of the second eNB.

26. An apparatus for performing cell selection in a wireless network, said apparatus comprising:
- means for receiving, by a first evolved Node B (eNB) having a first uplink/downlink (ULDL) configuration and in communication with a User Equipment (UE), a ULDL preference of the UE;
- means for comparing, by the first eNB, the first ULDL configuration and a second ULDL configuration of a second eNB in communication with the UE to the ULDL preference of the UE; and
- means for selecting, by the first eNB, the second eNB based at least in part on the second ULDL configuration matching the ULDL preference.

27. The apparatus of claim 26, wherein the means for comparing includes means for comparing uplink heavy configurations, downlink heavy configurations, and symmetric configurations.

28. The apparatus of claim 26, wherein the apparatus further includes:
- means for detecting whether one of the first ULDL configuration or the second ULDL configuration, but not both, is a dynamic configuration, wherein the means for detecting performs the detecting in response to neither the first configuration nor the second configuration matches the ULDL preference of the UE,
- wherein the means for selecting includes means for selecting one of: the first eNB or the second eNB having the dynamic configuration.

29. The apparatus of claim 26, wherein the apparatus further includes:
- means for exchanging ULDL configuration data with the second eNB.

30. The apparatus of claim 26, wherein the method further includes:
- means for triggering handover of the UE to the second eNB in response to selection of the second eNB.

31. A computer program product comprising:
- a non-transitory computer-readable medium including:
  - code for receiving, by a first evolved Node B (eNB) having a first uplink/downlink (ULDL) configuration and in communication with a User Equipment (UE), a ULDL preference of the UE;

code for comparing, by the first eNB, the first ULDL configuration and a second ULDL configuration of a second eNB in communication with the UE to the ULDL preference of the UE; and code for selecting, by the first eNB, the second eNB based at least in part on the second ULDL configuration matching the ULDL preference.

32. The computer program product of claim 31, wherein the code for comparing includes code for comparing uplink heavy configurations, downlink heavy configurations, and symmetric configurations.

33. The computer program product of claim 31, wherein the computer-readable medium further includes:

code for detecting whether one of the first ULDL configuration or the second ULDL configuration, but not both, is a dynamic configuration, wherein the code for detecting performs the detecting in response to neither the first configuration nor the second configuration matching the ULDL preference of the UE, wherein the code for selecting includes code for selecting one of: the first eNB or the second eNB having the dynamic configuration.

34. The computer program product of claim 31, wherein the computer-readable medium further includes:

code for exchanging ULDL configuration data with the second eNB.

35. The computer program product of claim 31, wherein the computer-readable medium further includes:

code for triggering handover of the UE to the second eNB in response to selection of the second eNB.

36. An evolved Node B (eNB) having a first uplink/downlink (ULDL) configuration and in communication with a User Equipment (UE), the eNB comprising:

at least one processor; and a memory coupled to said at least one processor, wherein said at least one processor is configured to:

receive a ULDL preference of the UE;

compare the first ULDL configuration and a second ULDL configuration of a second eNB in communication with the UE to the ULDL preference of the UE; and select the other eNB based at least in part on the second ULDL configuration matching the ULDL preference.

37. The eNB of claim 36, wherein the at least one processor is configured to compare uplink heavy configurations, downlink heavy configurations, and symmetric configurations.

38. The eNB of claim 36, wherein the at least one processor is configured to:

detect whether one of the first ULDL configuration or the second ULDL configuration, but not both, is a dynamic configuration, wherein the at least one processor is configured to detect in response to neither the first configuration nor the second configuration matching the ULDL preference of the UE, wherein the at least one processor is configured to select one of: the first eNB or the second eNB having the dynamic configuration.

39. The eNB of claim 36, wherein the at least one processor is configured to:

exchange ULDL configuration data with the other eNB.

40. The eNB of claim 36, wherein the at least one processor is configured to:

trigger handover of the UE to the other eNB in response to selection of the other eNB.

* * * * *